US011821840B2

United States Patent
Cardenas et al.

(10) Patent No.: US 11,821,840 B2
(45) Date of Patent: Nov. 21, 2023

(54) APPARATUS AND METHOD FOR MEASURING THE REFLECTIVITY OR TRANSMITTIVITY OF AN OPTICAL SURFACE

(71) Applicant: UltraFast Innovations GmbH, Garching (DE)

(72) Inventors: Daniel Cardenas, Munich (DE); Minjie Zhan, Munich (DE); Asger Kreiner, Munich (DE); Alexander Guggenmos, Miesbach (DE)

(73) Assignee: Ultrafast Innovations GmbH, Garching (DE)

( * ) Notice: Subject to any disclaimer, the term of this patent is extended or adjusted under 35 U.S.C. 154(b) by 137 days.

(21) Appl. No.: 17/522,380

(22) Filed: Nov. 9, 2021

(65) Prior Publication Data

US 2022/0146423 A1 May 12, 2022

(30) Foreign Application Priority Data

Nov. 11, 2020 (EP) .................................... 20206978

(51) Int. Cl.
*G01N 21/55* (2014.01)
*G01N 21/21* (2006.01)
*G01M 11/00* (2006.01)

(52) U.S. Cl.
CPC ............ *G01N 21/55* (2013.01); *G01M 11/005* (2013.01); *G01N 21/21* (2013.01); *G01N 2021/558* (2013.01); *G01N 2201/0697* (2013.01)

(58) Field of Classification Search
CPC .. G01N 21/55; G01N 21/21; G01N 2021/558; G01N 2201/0697; G01M 11/005
See application file for complete search history.

(56) References Cited

U.S. PATENT DOCUMENTS

2010/0045948 A1* 2/2010 Kraus .................... G01N 21/55
355/30
2012/0236314 A1* 9/2012 Fermann .................. H01S 3/10
356/479

FOREIGN PATENT DOCUMENTS

DE    10 2007 042 172 A1    3/2009

OTHER PUBLICATIONS

Baselt et al., Application of a microchip laser pumped photonic crystal fiber supercontinuum source for high sensitive cavity ring down optical loss measurements, published paper, Feb. 19, 2009, https://doi.org/10.1117/12.809324.

Laurila et al., A calibration method for broad-bandwidth cavity enhanced absorption spectroscopy performed with supercontinuum radiation, journal Applied Physics B; Lasers and Optics, May 22, 2010, pp. 271-278, vol. 102, No. 2, Springer Berlin, Germany.

(Continued)

*Primary Examiner* — David P Porta
*Assistant Examiner* — Fani Polyzos Boosalis
(74) *Attorney, Agent, or Firm* — Tautz & Schuhmacher LLC (57) ABSTRACT

An apparatus and a method measure a reflectivity and/or transmittivity of an optical surface. The apparatus includes a pulsed coherent white light source for generating pulsed coherent white light, wherein the apparatus is adapted to irradiate the optical surface with at least a part of the generated pulsed coherent white light.

12 Claims, 4 Drawing Sheets

(56) References Cited

OTHER PUBLICATIONS

Schmidl G et al., Spectrally resolved cavity ring down measurement of high reflectivity mirrors using a supercontinuum laser source, journal Applied Optics, Dec. 10, 2009, pp. 6754-6759, vol. 48, No. 35, Optical Society of America, Washington DC, USA.
Stelmaszyk K et al., Towards Supercontinuum cavity ring-down spectroscopy, journal Applied Physics B; Lasers and Optics, Nov. 29, 2008, pp. 369-373, vol. 94, No. 3, Springer Berlin, Germany.
Sridhar G et al., Cavity ring-down technique for measurement of reflectivity of high reflectivity mirrors with high accuracy, journal Pramana; Journal of Physics, Jul. 12, 2011, pp. 1233-1239, vol. 75, No. 6, Springer, India.
D. Z. Anderson et al., Mirror reflectometer based on optical cavity decay time, journal Applied Optics, Apr. 15, 1984, pp. 1238-1245, vol. 23, No. 8, Optical Society of America, USA.
G. Berden et al., Cavity ring-down spectroscopy: Experimental schemes and applications, journal Int. Reviews in Physical Chemistry, Nov. 26, 2010, pp. 565-607, vol. 19, No. 4, published online.
A. Yariv, Quantum Electrodynamics (3rd ed), book, Sep. 1987, Chapter 7.1, pp. 136-141, John Wiley & Sons, Inc., USA.

* cited by examiner

APPARATUS AND METHOD FOR MEASURING THE REFLECTIVITY OR TRANSMITTIVITY OF AN OPTICAL SURFACE

CROSS-REFERENCES TO RELATED APPLICATIONS

This application claims the benefit of the filing date of the European Patent Application No. 20 206 978.7, filed Nov. 11, 2020, entitled "Apparatus and method for measuring the reflectivity or transmittivity of an optical surface".

TECHNICAL FIELD

The disclosure relates to an apparatus and a method for measuring the reflectivity and/or transmittivity of an optical surface, an apparatus for cavity ring-down spectroscopy, a light source for cavity ring-down spectroscopy and/or reflectometry and the use of a pulsed coherent white light source for measuring the reflectivity and/or transmittivity of an optical surface and/or as a light source for cavity ring-down spectroscopy.

BACKGROUND

Conventional methods for measuring the reflectivity of optical surfaces, such as optical surfaces of optical elements, relies on measuring a light intensity with and without the reflecting surface. Such methods are limited by the stability of the used light source, which is typically on the order of 0,1%, and this method can, thus, only measure mirror losses above 1.000 ppm. This is insufficient for highly reflective mirrors with losses well below 1.000 ppm. For mirror losses below 1.000 ppm the cavity ring-down method can be applied, which is described for example in the publication Applied Optics, 23(8), 1238-1245 by D. Z. Anderson et al. For cavity ring-down measurements an optical cavity is employed, wherein the optical surface, whose reflectivity and/or transmittivity is to be measured, is integrated in the optical cavity. A laser pulse is coupled into the optical cavity and the light or optical power leaking out of the cavity is measured. Based on the decay of the light or optical power leaking out of the cavity, the cavity losses can be derived. The loss due to an imperfect reflectivity and/or transmittivity of the optical surface can be derived from a difference in the loss of the cavity with and without the optical surfaces being integrated. This method is not relying on the absolute intensity of the light source but rather a time-resolved decay, which allows the characterization of highly reflective optical surfaces, such as optical surfaces of low loss mirrors.

For cavity ring-down reflectometry diode lasers are typically used as light sources, wherein the diode laser has to be chosen such that the emission wavelength corresponds to the wavelength, for which the reflectivity of the optical surface is to be determined.

SUMMARY

The objective technical problem relates to providing an apparatus and a method for measuring a transmittivity and/or reflectivity of optical surfaces offering a higher flexibility with regard to the characterization of the reflectivity and/or transmittivity of optical surfaces.

The objective technical problem is solved by examples of the disclosure having the features of the respective independent claims. Other examples are specified in the dependent claims and in the following description.

In an example, the present disclosure relates to an apparatus for measuring a reflectivity and/or transmittivity of an optical surface, wherein the apparatus includes a pulsed coherent white light source for generating pulsed coherent white light, wherein the apparatus is adapted to irradiate the optical surface with at least a part of the generated pulsed coherent white light.

In another example, the disclosure relates to an apparatus for cavity ring-down spectroscopy, wherein the apparatus includes a pulsed coherent white light source which is optionally designed as a pulsed supercontinuum laser light source.

In yet another example, the disclosure relates to a light source for cavity ring-down spectroscopy including a pulsed coherent white light source and a monochromator.

In yet another example, the disclosure relates to a method for measuring a reflectivity and/or transmittivity of an optical surface, wherein the method includes irradiating the optical surface with at least a part of pulsed coherent white light generated by a pulsed coherent white light source.

In yet another example, the disclosure relates to a use of a pulsed coherent white light source for measuring a reflectivity and/or transmittivity of an optical surface and/or as a light source for cavity ring-down reflectometry and/or as a light source for cavity ring-down spectroscopy.

A pulsed coherent white light source is a light source capable of emitting optically coherent light, such as a laser light source, allowing the emitted light waves interfering with themselves. The term "white light" indicates that the light generated by the pulsed coherent white light source is adapted to emit light having a broad spectral bandwidth, which is optionally more than 100 nm, optionally more than 200 nm, optionally more than 300 nm, optionally more than 400 nm at full width at half maximum (FWHM). The term "white light", however, does not require the optical perception of the white light being associated with white color for the human eye or any other kind of observer. The pulsed coherent white light source furthermore is adapted to emit the generated pulsed coherent white light in a pulsed manner. For instance, the pulse width of the emitted light pulses may be in the range of femtoseconds to hundreds of nanoseconds or even one or few microseconds. A light source is considered as a pulsed light source even if the light source may have one or more operating modes including the emission of continuous light waves, which may not be suitable for use according to some or all of the presented examples.

An optical surface is a surface having specific optical properties. In some cases, the optical surface may be a surface of an optical element, such as a mirror, a lens, or a beam splitter. The optical surface may be particularly suited for optical applications. In particular, the optical surface may have a surface roughness of λ/10 or less, wherein λ, represents the (central) wavelength of light irradiated onto the optical surface according to the respective intended use of the optical surface.

The reflectivity of an optical surface represents its ability to reflect incident light waves. The reflectivity may be specified for one or more predetermined (central) wavelengths and/or wavelength ranges. The reflectivity may solely relate to the ratio of light that is deflected by the optical surface by means of an optical reflection maintaining the wavefront of the incident light wave. Alternatively, the reflectivity may also include the ability of the optical surface to backscatter a part of an incident light wave. The reflectivity of an optical surface may be expressed in terms of a ratio of the reflected light over the incident light for a predetermined wavelength (range) and may be expressed for instance in percent, such as 99,999%. Alternatively, the deviation of the optical surface's reflectivity from perfect reflectivity may be specified, for instance in parts-per-thousand (ppt) or parts-per-million (ppm). The transmittivity correspondingly represents the optical surface's ability to transmit an incident light wave for one or more wavelengths and/or wavelength ranges, i.e., the ability to prevent a reflection and/or backscattering of the incident light wave at the optical surface.

These examples provide the advantage that the apparatus and/or method are adjustable for measuring the reflectivity and/or transmittivity at various wavelengths and/or wavelength ranges without a need of exchanging the light source. In particular, these examples allow reflectivity and/or transmittivity measurements without the need of providing a large variety of different light sources. Instead, one light source is provided covering a large spectral range, in which typically reflectivity and/or transmittivity measurements of optical surfaces are performed. Since according to these examples no exchange of the light source is required for changing the wavelength for measuring the reflectivity and/or reflectivity, the conventionally required effort for (re-) aligning the system is reduced. Therefore, these examples provide the benefit of reducing the maintenance effort.

These examples further provide the advantage that reflectivity and/or transmittivity measurements may be carried out in spectral ranges and/or at wavelengths, which are not reliably accessible with laser diodes. Since laser diodes are typically available only for certain emission wavelengths, which are predetermined by the semiconductor material, on which the laser diodes are based, the emission spectrum of laser diodes cannot be arbitrarily tuned. Thus, in spectral regions, which are not accessible with laser diodes, reflectivity and/or transmittivity cannot be measured with conventional techniques of cavity ringdown measurements based on laser diodes. However, these examples allow carrying out reflectivity and/or transmittivity measurements also at wavelengths and/or in wavelength ranges not accessible with laser diodes. The terms laser diodes and diode lasers are used as synonyms.

According to an example, the pulsed coherent white light source is designed as a pulsed supercontinuum laser light source or comprises a pulsed supercontinuum laser light source. This provides the benefit that a pulsed coherent white light having a broad spectral range can be provided in an efficient manner. Moreover, the pulsed supercontinuum laser light source allows reliably providing the pulsed coherent white light with a low maintenance effort. In addition, the pulsed supercontinuum laser light source allows providing the pulsed supercontinuum laser light source with a short pulse duration without additional technical effort for compressing the light pulses.

The pulsed coherent white light source optionally comprises a photonic crystal fiber (PCF). The PCF allows significant spectral broadening of laser pulses initially having a limited spectral range to generate pulsed coherent white light. The PCF may be based on generating an optical soliton from laser pulse coupled into the PCF and achieving a significant optical broadening while maintaining a pulse duration in the picosecond or nanosecond range suitable for the appliance in cavity ring-down reflectometry.

According to an example, the pulsed coherent white light source is designed to generate pulsed coherent white light covering a spectral wavelength range of at least 675 nm to 975 nm, optionally at least 650 nm to 1 µm, optionally at least 600 nm to 1,6 µm and optionally at least 500 nm to 2 µm. Such spectral ranges may be achieved by a spectral broadening of laser pulses having a central wavelength in the range of 640 nm, 800 nm, 1047 nm, 1053 nm or 1064 nm, based on spectral broadening in a PCF and/or hollow core fibers. Having the generated pulsed coherent white light covering such broad spectral ranges allows covering all or most wavelengths which are typically of interest for measuring the reflectivity and/or transmittivity of an optical surface, such as the near infrared and/or visible wavelength range. According to other examples the spectral broadening may include the generation of spectral components in the ultraviolet spectral range, which may allow measuring the reflectivity and/or transmittivity at ultraviolet wavelengths covered by this wavelength range. According to an example, the central wavelength and/or the spectral wavelength range of the spectrally filtered pulsed coherent light is adjustable over at least 50%, optionally at least 60% and optionally at least 80% of the spectral bandwidth of the light generated by the white light source.

Pulsed coherent white light, in particular ultra-broad and coherent white light, can be generated by several different nonlinear effects, such as self- and cross-phase modulation (SPM,CPM), soliton effects, Raman scattering, modulation instability and/or four wave mixing in matter (gases, liquids or solids). For instance, femtosecond laser pulses may be spectrally broadened by focusing the laser pulses into and propagation within a hollow-core fiber filled for instance with a noble gas. SPM then generates additional spectral components (having lower and higher frequencies than the initial spectrum) when interacting with the noble gas. Alternatively or additionally, femtosecond pulses can be focused onto and/or in silica glass to generate ultra-broad and coherent white light. However, using a photonic crystal fiber (PCF) for spectral broadening provides the advantage that it allows a more compact generation as compared to other techniques. The photonic crystal fibers may be pumped with (optionally compressed) laser pulses in the femtosecond to nanosecond regime. Nanosecond pulses provide the advantage over picosecond or femtosecond pulses that light sources often are cheaper, more compact, less complex and/or require less maintenance effort than picosecond- or femtosecond laser sources.

According to an example, the apparatus further comprises a monochromator and/or a spectral bandpass filter for spectrally filtering the generated pulsed coherent white light to spectrally isolate pulsed coherent light having a predetermined central wavelength and/or a predetermined wavelength range, wherein the part of the generated pulsed coherent white light for irradiating the optical surface is formed by the spectrally isolated pulsed coherent light. This allows isolating a desired wavelength or wavelength range from the pulsed coherent white light. The monochromator and/or spectral bandpass filter are adapted such as to maintain the coherence of the transmitted, isolated pulsed coherent light, which may be required for the use of the isolated pulsed coherent light according to some examples. In particular for applications involving an interference of the pulsed coherent light the maintenance of the optical coherence is desired.

According to an example, the monochromator is adjustable to select the central wavelength and/or wavelength range of the spectrally isolated pulsed coherent light according to the predetermined central wavelength and/or wavelength range. In other words, the monochromator optionally allows selecting the central wavelength of the pulsed coherent light to be spectrally isolated from the pulsed coherent white light and may allow also to select the spectral range or width, for instance the full width at half maximum (FWHM), of the isolated spectral components. This may be beneficial for adjusting the reflectivity and/or transmittivity measurements to the specific requirements and properties of the optical surface being subject of the measurement. Furthermore, the adjustable monochromator increases the flexibility of the apparatus to be used for measurements at various wavelengths in an isolated manner, i.e. with a narrow or predetermined spectral bandwidth or linewidth.

The adjustable monochromator may be adapted to spatially separate some of the spectral parts of the pulsed coherent white light generated by the pulsed coherent white light source. This may allow selecting the desired spectral component(s) by means of a spatial selection. For instance, the propagation direction of the isolated spectral part may be altered by the monochromator, thus, allowing its separation from the remaining spectral parts of the pulsed coherent white light by spatial means. For instance, the monochromator may comprise one or more diffractive gratings for deflecting at least a part of the pulsed coherent white light depending on the wavelength of the respective part. Alternatively or additionally, the monochromator may comprise an acousto-optic tunable filter for deflecting at least a part of the pulsed coherent white light in the desired wavelength range. The acousto-optic tunable filter may be based on an at least partly transparent crystal, whose refractive index may be locally modulated by applying a RF acoustic wave to the crystal. This modulated refractive index may, thus, provide a controllable diffractive element for isolating a desired part of the pulsed coherent white light. Using a monochromator comprising an acousto-optic tunable filter may provide the advantage that the spectral part to be isolated from the pulsed coherent white light can be varied by simply changing the settings for an RF driver driving the RF acoustic wave applied to the crystal.

An acousto-optic tunable filter of a monochromator may be adapted to allow exchanging the crystal. Some crystals may be transparent and/or applicable only in a predetermined spectral range, wherein said spectral range may be smaller than the emission spectrum of the pulsed coherent white light source. Therefore, in an apparatus according to an example, the monochromator may be the limiting factor in terms of the tunability of the pulsed coherent light filtered from the pulsed coherent white light. In some cases, changing the central wavelength and/or the spectral range of the pulsed coherent light filtered from the pulsed coherent white light may, thus, include exchanging the crystal of the acousto-optic tunable filter to a crystal adapted for a spectral range including the desired wavelength range of the pulsed coherent light to be isolated. Various crystals may be provided for covering most of or the entire spectral bandwidth of the pulsed coherent white light generated by the pulsed coherent white light source.

According to an example, the apparatus further includes a polarization adjustment element for adjusting the polarization of the pulsed coherent light, wherein the polarization adjustment element optionally comprises or consists of a $\lambda/2$-waveplate. This allows adjusting the polarization type and/or direction of the light irradiated onto the optical surface. The polarization adjustment element may be suitable for adjusting the polarization direction of linearly polarized light. Alternatively or additionally, the polarization adjustment device may be adapted to convert linearly polarized light into elliptically and/or circularly polarized light and vice versa. Thus, the polarization adjustment element allows measuring the reflectivity and/or transmittivity of an optical surface at specified polarization types and directions and/or allows measuring with various polarization types and/or directions.

According to an example, the apparatus further comprises a resonator cavity allowing to integrate the optical surface, whose reflectivity and/or transmittivity is to be measured, into the resonator cavity for measuring the reflectivity and/or transmittivity of the optical surface by using cavity ring-down reflectometry. This allows measuring the reflectivity and/or transmittivity with outstanding sensitivity. Therefore, the apparatus according to this example is particularly suited for measuring the reflectivity of highly reflective optical surfaces, such as highly-reflective mirrors, and/or to measure the transmittivity of highly transmissive optical elements, such as anti-reflection coated optical elements. The cavity ring-down measurement may be based on measuring directly or indirectly a loss of optical power stored in the resonator cavity. Measuring the loss of optical power of said resonator cavity may include measuring a transmission of optical power through at least one resonator mirror of the resonator cavity. To determine the reflectivity and/transmittivity of the optical surface, at least one measurement is performed with the optical surface being integrated into the resonator cavity and at least one measurement is performed with the optical surface not being integrated into the resonator cavity. Based on the differences in the temporal decay of the optical power stored in the resonator cavity between the (at least) two measurements, the reflectivity and/or transmittivity of the optical surface can be estimated or determined.

According to another example the apparatus further comprises a positioning device for changing and/or controlling a position and/or orientation of the first and/or second cavity mirror to allow measuring the reflectivity of the optical surface (24a) at different angles of incidence. This facilitates modifying the angle of incidence, for which the reflectivity and/or transmittivity of the optical surface shall be measured. Alternatively or additionally the apparatus may comprise a positioning device comprising a rotatable mount for supporting an optical element, the reflective surface of which is to be measured, in a rotatable manner. This facilitates bringing the cavity mirror(s) in a suitable position and/or orientation for reflecting the pulsed coherent light reflected by the optical surface at the selected angle of incidence. The adjustment of the optical surface and/or the one or more cavity mirrors may be carried out in an automated manner, for instance by providing a respective control unit controlling the positioning device. This the use of the apparatus and may allow an automated sequential measurement of the reflectivity and/or transmittivity for several angles of incidence. This may optionally be combined with an automated selection of the wavelength of the optical coherent light, such that it may be combined with measurements for different wavelengths and/or spectral ranges of the pulsed coherent light.

Accordingly, in another example, the method for measuring a reflectivity and/or transmittivity of an optical surface may further comprise a step of integrating an optical element having the optical surface whose reflectivity is to be measured, in a resonator cavity having a first cavity mirror and a second cavity mirror. The method according to said example may comprise a further step of selecting an angle of incidence for measuring the reflectivity and/or transmittivity of the optical surface. The changing and/or controlling the angle of incidence comprises rotating the optical element such that the pulsed coherent light impinges at the optical surface at the selected angle of incidence, and changing and/or controlling a position and/or orientation of the first and/or second cavity mirror to allow measuring the reflectivity of the optical surface at the selected angle of incidence. In particular, the steps for selecting an angle of incidence may be carried out in a fully or partly automated manner.

It is understood by a person skilled in the art that the above-described features and the features in the following description and figures are not only disclosed in the explicitly disclosed examples and combinations, but that also other technically feasible combinations as well as the isolated features are comprised by the disclosure. In the following, several examples are described with reference to the figures for illustrating the disclosure without limiting the disclosure to the described examples.

Further examples will be illustrated in the following with reference to the drawings.

BRIEF DESCRIPTION OF THE DRAWINGS

The same reference symbols are used for corresponding or similar features in different drawings.

DESCRIPTION

Figure 1:
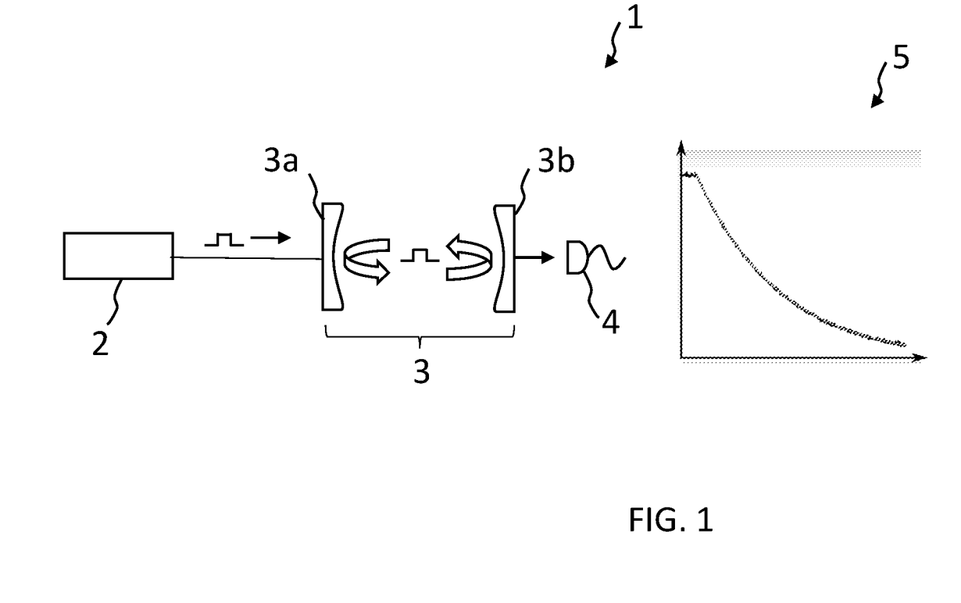
FIG. 1 illustrates the principle of a conventional measurement apparatus for a cavity ring-down measurement.

FIG. 1 illustrates the principle of a conventional measurement apparatus 1 for a cavity ring-down measurement. The conventional apparatus 1 comprises a laser diode 2 emitting laser pulses of a specific wavelength and spectral line width. The wavelength and the line width of the emitted laser pulses are determined by the laser diode, in particular by the active material of the laser diode. The apparatus 1 further comprises a resonator cavity 3 comprising two cavity mirrors 3a and 3b. The laser pulses emitted by the laser diode 2 are coupled into the resonator cavity 3 via the first cavity mirror 3a. Furthermore, the apparatus comprises an optical detector 4 arranged behind the second cavity mirror 3b for measuring the optical power or any other related signal to determine the leakage of optical power through the second cavity mirror 3b. The signal provided by the optical detector 4 is then monitored and allows determining the optical power or optical energy stored in the resonator cavity.

For determining the reflectivity or transmittivity of an optical surface, such as an optical surface of an optical element, the optical surface is to be integrated into the resonator cavity 3. Based on the alteration of the loss of the resonator cavity 3, the reflectivity or transmittivity of the optical cavity can be determined.

This conventional apparatus 1 allows measuring the reflectivity or transmittivity of an optical surface at the specific wavelength predetermined by the emission wavelength of the laser diode. In addition, the cavity mirrors 3a and 3b and also the detector 4 have to be suitable for the specified wavelength. Measuring the reflectivity or transmittivity of the optical surface at a different wavelength requires exchanging the laser diode 2 with a laser diode having the desired emission wavelength. Optionally, also the cavity mirrors 3a and 3b and/or the detector 4 have to be adapted to the different wavelength.

The principle of the cavity ring-down measurement is described in the following. The laser pulse at the specific wavelength emitted by the laser diode 2 is coupled into the optical resonator cavity 3 through one of the two highly reflective cavity mirrors 3a that define the cavity 3. Only a small portion of the incoming light is coupled into the cavity 3 as the cavity mirrors 3a and 3b have highly reflective surfaces. The light that is coupled into the cavity travels between the cavity mirrors 3 is reflected a large number of times and accordingly travels for a large number of roundtrips inside the resonator cavity 3, since only a small fraction of the light is lost at each pass through the cavity 3. This small cavity loss will, however, cause the light, i.e. the optical energy stored in the cavity 3, to decay over time. As illustrated, some light is leaked through the second cavity mirror 3b (end mirror) which can be detected by detector 4. The leaked light is proportional to the intra-cavity intensity, i.e., the optical energy stored inside the cavity 3. The intensity I(t) which is detected by the detector 4 follows an exponential decay with time t, as exemplarily shown in the diagram 5:

$$I(t) = I_0 \cdot \exp\left(-\frac{\alpha c t}{L}\right) \quad (1)$$

where $I_0$ is the initial intensity measured, L is the cavity length, a the cavity loss and c is the speed of light. The cavity loss a can thus be determined through an exponential fit of the measured decay and is seen to be independent of the initial intensity.

The loss originating in an optical surface to be tested is determined by performing a measurement of a cavity 3 with and without the optical surfaces included in the cavity 3. The difference in loss between such two measurements can, thus, be attributed to the loss of the optical surface being subject of the measurement. For measurements of the reflectivity of an optical surface under and angle of incidence of 0° may include three measurements for characterizing the cavity mirrors and the optical surface, i.e., one reference measurement and two measurements where the optical surface takes the place of one cavity mirror 3a or 3b, respectively. This gives three equations (total cavity losses) with three unknowns (individual mirror loss).

Figure 2A:
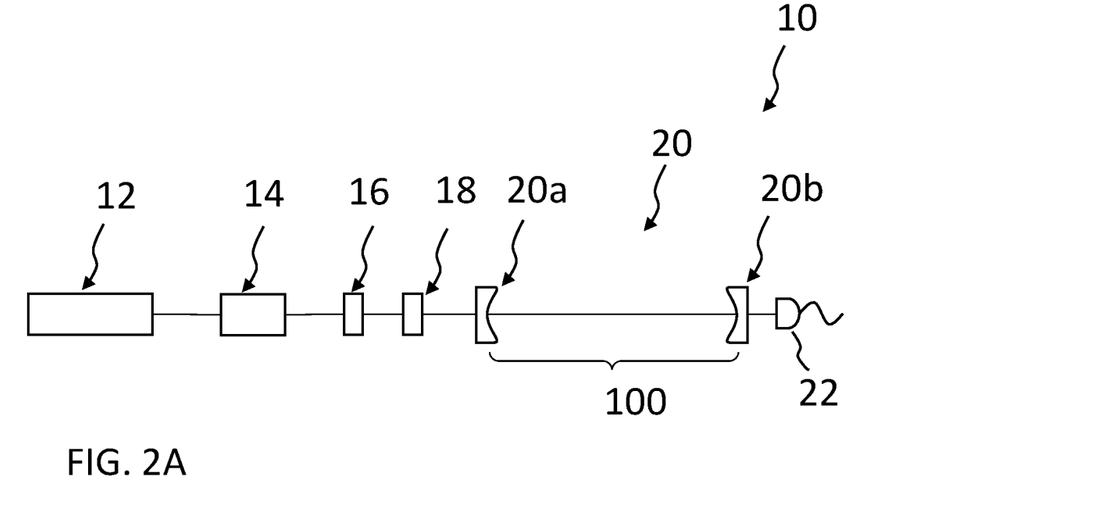
FIGS. 2A to 2C depict different examples of apparatuses for measuring a reflectivity and/or transmittivity of an optical surface.
Figure 2B:
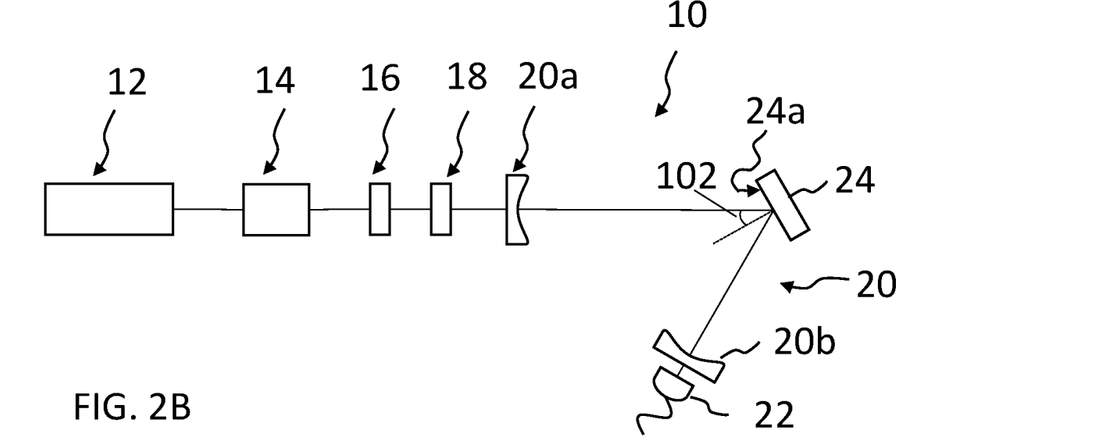
Figure 2C:
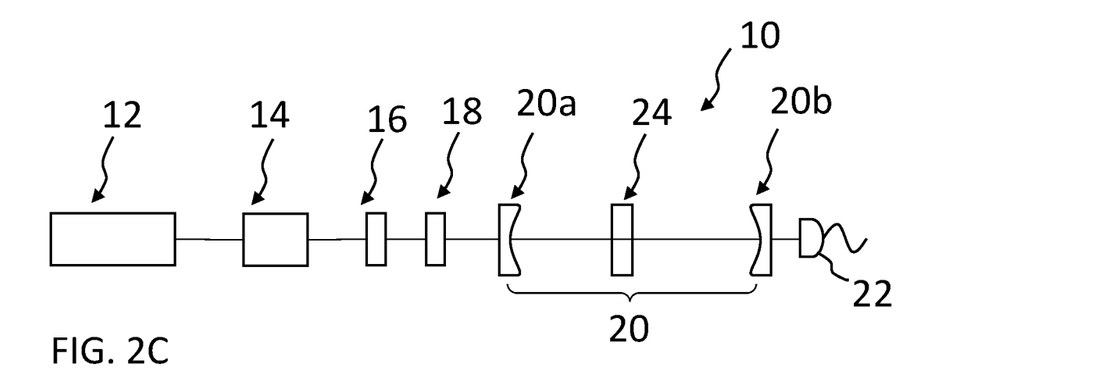

FIGS. 2A to 2C depict different apparatuses 10 for measuring a reflectivity and/or transmittivity of an optical surface according to examples of the disclosure. Each depicted apparatus 10 comprises a pulsed coherent white light source 12, a monochromator 14, a polarization adjustment element 16, a spectral bandpass filter 18, an optical resonator cavity 20 comprising two cavity mirrors 20a and 20b, and a detector 22. The apparatuses are configured to carry out cavity ring-down measurements, as discussed with reference to FIG. 1.

The apparatuses 10 depicted in FIGS. 2A to 2C differ from the conventional apparatus 1 shown in FIG. 1, as will be explained in the following. Instead of using a laser diode as a light source, as illustrated for the conventional apparatus in FIG. 1, the apparatuses 10 according to these examples each comprise a pulsed coherent white light source 12. The pulsed coherent white light source 12 is adapted to emit laser pulses having a significantly larger spectral bandwidth than conventional laser diodes. For instance, the wavelength spectrum of the laser pulses emitted by the pulsed coherent white light source 12 may extend from about 500 nm to about 2 μm. The pulsed coherent white light source 12 may be provided with a photonic crystal fiber for spectrally broadening laser pulses initially having a smaller spectral bandwidth. Furthermore, the apparatuses comprise a monochromator 14 for spectrally filtering the pulsed coherent white light generated by the pulsed coherent white light source 12 to spectrally isolate the pulsed coherent light at a desired central wavelength and with a desired linewidth for the cavity ring-down measurements. Further details about the pulsed coherent white light source and the monochromator are provided further below.

In the following, further details about the apparatuses according to the examples depicted in FIGS. 2A to 2C will be explained.

The example shown in FIG. 2A comprises a resonator cavity 20, which is configured as a linear cavity. The length of the resonator cavity is denoted with reference sign 100. This linear cavity configuration may be used to characterize the loss of the cavity 20 itself (without any optical surface to be measured) and, thus, may serve for conducting a reference measurement for comparison with measurements for determining the loss due to an imperfect reflectivity and/or transmittivity of an optical surface. Moreover, by exchanging the first cavity mirror 20a with an optical surface to be measured, such as an optical element, for a first measurement and afterwards exchanging the second cavity mirror 20b with the optical surface to be measured, the loss and the reflectivity of the optical surface can be measured at an angle of incident (AOI) of 0°. Needless to say that the order in which cavity mirror to be exchanged by the optical surface may be varied.

FIG. 2B depicts an example comprising a resonator cavity 20 having a V-alignment, wherein the longitudinal axis of the resonator cavity 20 is arranged like the legs of a triangle or the legs of the letter "V". This configuration may be used for measuring the reflectivity of an optical surface 24a of an optical element 24 at an angle of incidence different than 0°. The angle of incidence is denoted with the reference sign 102 and is exemplarily shown with about 30° in the depicted example. According to some examples the apparatus may be configured such that the angle of incidence 102 may be varied. Optionally, the orientation of the optical element 24 and the position and orientation of the second cavity mirror 20b and the detector 22 may be adaptable to set different angles of incidence 102. This allows measuring the reflectivity of optical surfaces 24 at different angles of incidence 102.

FIG. 2C depicts an example configured to measure the transmission of a highly transmissive optical element 24 having one or more highly transmissive surfaces 24a. According to this example, the optical element 24 may be arranged within the optical resonator cavity 20. Measurements with and without the optical element 24 arranged inside the resonator cavity 20 may be carried out and compared for determining the losses originating in the optical element and the transmittivity may be deducted from said loss measurement.

In the following, further optional details and explanations regarding the pulsed coherent white light source 12 and the monochromator 14 are presented.

The spectral range of the pulses emitted by the pulsed coherent white light source 12 determines the wavelength range that is available for the cavity ringdown measurements. The requirement for the light source is that it provides pulsed coherent light. A pulsed coherent white light source 12 and in particular a pulsed supercontinuum white light laser source is well suited for this purpose, since this allows for cavity ringdown measurements in a wide spectral range reaching from the ultraviolet into the infrared wavelength range. Merely as an example, the pulsed coherent white light source 12 may be of the type SuperK Compact of the manufacturer NKT PHOTONICS. Such a pulsed coherent white light source 12 is capable of emitting unpolarized light having a spectral range from 450 nm to about 2.000 nm. However, according to other examples another pulsed coherent white light source 12 may be used, extending further into the ultraviolet or infrared spectral range.

The pulsed coherent white light source 12 may be adapted to emit pulses with a duration in the range of 2 ns. However, according to other examples the pulse duration may be longer or shorter. The repetition rate of the laser pulses emitted by the pulsed coherent white light source 12 is adjusted in dependence of the length 100 of the resonator cavity 20 and the resonator cavity losses. The longer the resonator cavity 20 is, the slower the pulse, i.e. the optical energy stored within the resonator cavity 20, will leak out of the resonator cavity 20. According to the presented examples, resonator cavities 20 having a length between 450 mm and 650 mm are used, although other lengths may be used in other examples. With cavity losses around 100 ppm it will take approximately 100 μs before the optical energy has entirely leaked out of the resonator cavity 20. The repetition rate of the pulsed coherent white light coupled into the resonator cavity 20 may be chosen to avoid any overlapping of the pulses coupled into the resonator cavity 20 to avoid distortions of the cavity ringdown measurements. In other words, it may be beneficial to ensure that at any time there is not more than one pulse stored in the resonator cavity 20 simultaneously. Therefore, the next pulse should only then be coupled into the resonator cavity 20, after the previous pulse is entirely leaked out of the resonator cavity 20. A repetition rate of 4 kHz is employed, which gives a long enough time window of at least 200 μs to measure the cavity ring-down signal, which will extend over a time period of about 100 μs. The repetition rate is to be adjusted such that the next laser pulse will be coupled into the resonator cavity 20 only after the previous laser pulse has entirely leaked out of the laser cavity 20. It is to be noted that the repetition rate of the laser pulses emitted by the pulsed coherent white light source 12 may be higher than the above-mentioned maximum repetition rate. In this case, external measures may be taken to reduce the repetition rate to a suitable range, for instance by applying a pulse picker or any other means for selectively reducing the repetition rate of pulses coupled into the resonator cavity 20.

The monochromator 14 is used for filtering a specific wavelength or wavelength range out of the pulsed coherent white light generated by the pulsed coherent white light source 12. As a monochromator 14, all devices and/or optical components that only transmit or reflects a single wavelength or a narrow spectral bandwidth can be applied. Examples hereof are narrow bandpass filters or optical gratings with spatially selected wavelengths. Alternatively or additionally, an acousto-optic tunable filter (AOTF) (for instance SuperK Select by NKT PHOTONICS) may be used allowing to freely select the transmitted wavelength within a predetermined wavelength range without changing any optical component of the pulsed coherent white light source 12 and/or the monochromator 14. This provides the additional advantage that the apparatus 10 does not depend on the availability of optical narrowband bandpass filters for selecting the desired wavelength. The pulsed coherent light transmitted through the tunable monochromator may be linearly polarized. The monochromator optionally comprises an optical crystal driven by a radio-frequency (RF) signal for spatially dispersing the incident light. The wavelength can thus be spatially selected. The monochromator 14 may for instance be equipped with two AOTF crystals and may thus be provided with two corresponding output ports. The current output port may be selected using a flip mirror. The range of selectable wavelengths and their linewidth may depend on the AOTF crystals used:

TABLE 1

| Crystal nr. | Wavelength range | Linewidth |
|---|---|---|
| #1 | 400-650 nm | 1.8-8.5 nm |
| #2 | 430-700 nm | 0.5-1.85 nm |
| #3 | 450-700 nm | 2.5-8.5 nm |
| #4 | 500-900 nm | 3.5-14 nm |
| #5 | 640-1100 nm | 1.8-5 nm |
| #6 | 800-1400 nm | 2.6-9.6 nm |
| #7 | 1100-2000 nm | 6.4-19.8 nm |

Table 1 provides an overview over various AOTF crystal types and the corresponding wavelength ranges and linewidths.

The examples shown in FIGS. 2A to 2C further comprise an optional polarization adjustment element 16 and an optional spectral bandpass filter 18.

The optional polarization adjustment element 16 is arranged before the resonator cavity 20 and provides control of the polarization of the pulsed coherent light for the cavity ringdown measurement. Merely as an example, the polarization adjustment element 16 may be formed as an achromatic half wave plate ($\lambda/2$-wave plate), wherein the half wave plate is optionally adapted for the central wavelength of the pulsed coherent light used for the cavity ring-down measurements.

The optional spectral band pass filter 18 may serve the purpose of reducing a possible coupling of undesired stray light into the resonator cavity. The spectral bandpass filter 18 is to be adapted to the central wavelength and/or wavelength range and/or line width of the pulsed coherent light transmitted through the monochromator 14.

In the following, further details regarding the resonator cavity 20 according to an example. The resonator cavity comprises two highly reflective spherical mirrors as cavity mirrors 20a and 20b and optionally an optical element to be tested, which may be a (flat) test-mirror. The detection sensitivity correlates to a large extend with the cavity mirror losses, i.e. lower cavity mirror losses result in higher detection sensitivity. Optionally, cavity mirrors with losses around 50 ppm may be used, which result in cavity losses of around 100 ppm. This may allow for measurement of test mirror losses down to 5 ppm with a suitable signal-to-noise ratio. The finesse of the cavity may, thus, be approximately 63.800.

As seen from FIGS. 2A to 2C, spherical mirrors may be used to build the optical resonator cavity 20. The used spherical mirrors may have a radius of curvature of about 1.000 mm corresponding to a focal length of 500 mm. The length 100 of the resonator cavity 20 employed are between 450 mm and 650 mm. This cavity design is, thus, close to a confocal resonator design as the cavity length 100 is close to the sum of the focal lengths of the cavity mirrors 20a and 20b. This ensures that the resonator cavity 20 is stable over a large number of roundtrips. This cavity design has a free spectral range of approximately 230 MHz-330 MHz and a mode linewidth of 3.6 kHz-5.3 kHz.

Cavity mirrors 20a and 20b only work within a given spectral range and switching the wavelength, thus, might require replacing the cavity mirrors by different types of cavity mirrors, which are suitable for the desired wavelength range. The cavity mirrors may for instance have a spectral range between 50 nm and 100 nm where low losses are ensured.

The detection of the cavity ring-down signal may be carried out by a detector 22 being adjusted as a time resolved photodetector. According to an example, an avalanche photodiode (APD) is used. APDs are able to detect and resolve the exponential decay of the leaked light from the resonator cavity 20 through one of the cavity mirrors 20a and 20b, such as the end mirror. To achieve a suitable sensitivity of the detector 22 in the entire spectral range of the pulsed coherent white light source 12 and the monochromator 14, several different detectors 22 may be applied to ensure high sensitivity in different spectral regions. For example, for the spectral range between 400 nm and 700 nm an UV-Enhanced Si-based APD may be used (for example Thorlabs, APD410A2). Between 700 nm and 1000 nm a Si-based APD may be used (for example Thorlabs, APD410A). Between 1000 nm and 2000 nm a GaAs-based APD may be used (for example Thorlabs, APD410C). The APDs may have a bandwidth, i.e., the inverse of the detector's response time, of 10 MHz, which allows to resolve the time dependent exponential decay of the cavity ring-down signal. The detectors may have a maximum conversion gain of $12.6 \cdot 10^6$ V/W, $26.5 \cdot 10^6$ V/W and $9.0 \cdot 10^6$ V/W at their respective peak responsivity wavelength.

Figure 3:
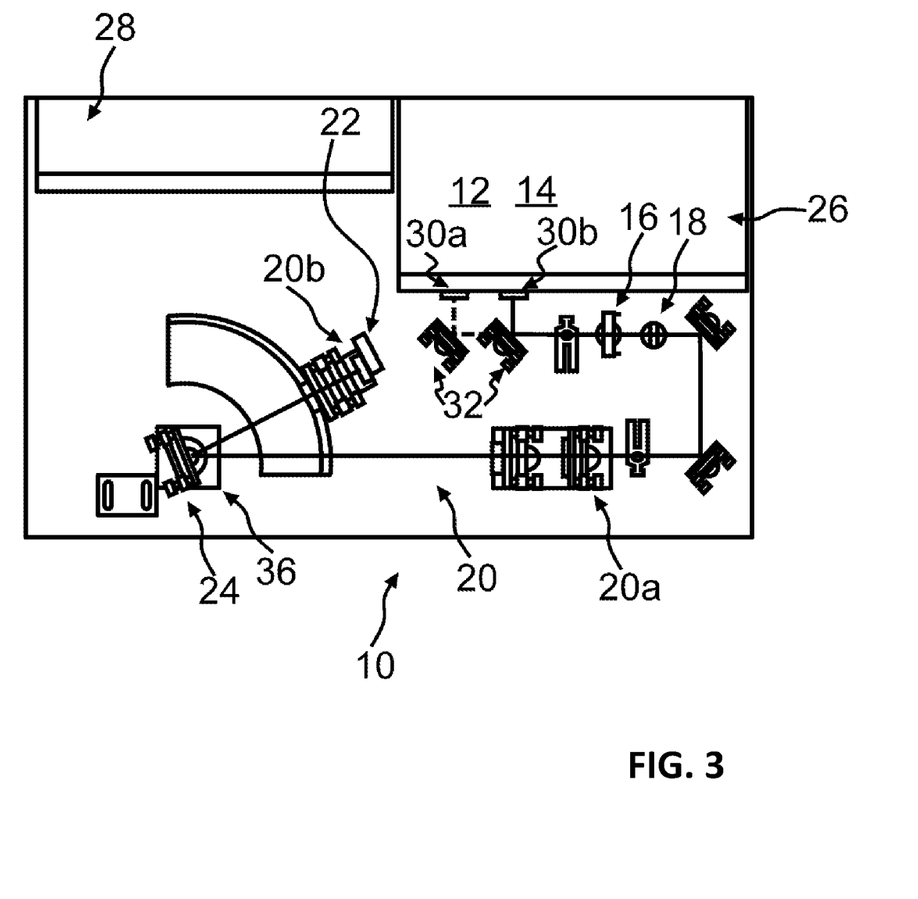
FIG. 3 shows a top view of an apparatus for measuring the reflectivity and/or transmittivity of an optical surface of an optical element.

FIG. 3 shows a top view of an apparatus 10 for measuring the reflectivity and/or transmittivity of an optical surface 24a of an optical element 24, wherein the optical path of the light rays is exemplarily indicated. The resonator cavity 20 extends between the first cavity mirror 20a and the second cavity mirror 20b and is arranged in a V-configuration. A pulsed coherent white light source 12 and a monochromator 14 are arranged inside a housing 26. A further housing 28 may contain electronic components, for instance for controlling the detector 22. The pulsed coherent white light is delivered to the monochromator 14 from the pulsed coherent white light source 12 through an optical fibre (not shown). This fibre extends through the housing 28 of the electronic enclosure into the monochromator enclosure. The housing 26 of the monochromator 14 has two exit ports 30a and 30b for the two exits from the tunable monochromator 14. The output from the monochromator 14 can be selected using a flip mirror 32 to forward only output of one selected exit port 30a or 30b. The beam is steered through a polarization control element 16, which is a half-wave plate, and a spectral band pass filter 18 into the optical cavity 20. Light leaked through the cavity end mirror, i.e. cavity mirror 20b, is detected using a detector 22, which is an APD. The apparatus 10 further comprises a positioning device 34 for changing and controlling the position of the cavity mirror 30b to allow measuring the reflectivity of the optical element 24 at different angles of incidence. For this purpose, the optical element 24 is mounted on a rotatable mount 36.

The apparatus 10 may be controlled by a control device (not shown), wherein the control device may be for instance a personal computer and/or a microcontroller. The control device may be configured to control the pulsed coherent white light source 12 and the monochromator 14 to specify the central wavelength and/or wavelength range and/or linewidth and/or pulse duration and/or repetition rate of the pulsed coherent light provided for the cavity ringdown-measurements.

Furthermore, the control device may be configured to receive the sensor data of the detector 22 and may further process the received sensor data. The control device may be capable of extracting the cavity loss by fitting the decaying signal from the detector 22 with an exponential decay function:

$$I(t) = I_0 \cdot \exp\left(-\frac{t}{\tau}\right) \quad (2)$$

When taking the length 100 of the cavity 20 into account, the cavity loss can be calculated. By comparing the loss of a cavity 20 with and without the optical surface 24a or element 24 being subject of the measurement, loss can be derived. In order to improve accuracy of this procedure, the measurement may be repeated, optionally 100.000 times or more, and the measurement results may be averaged.

Figure 4A:
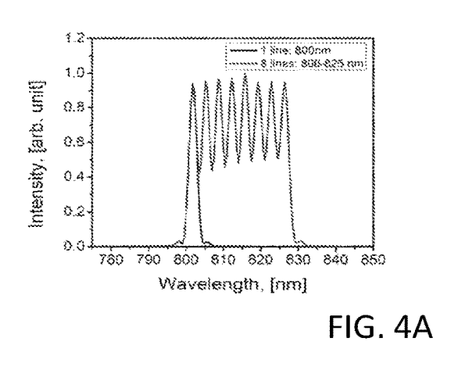
FIGS. 4A and 4B depict exemplary spectra of the pulsed coherent light.
Figure 4B:
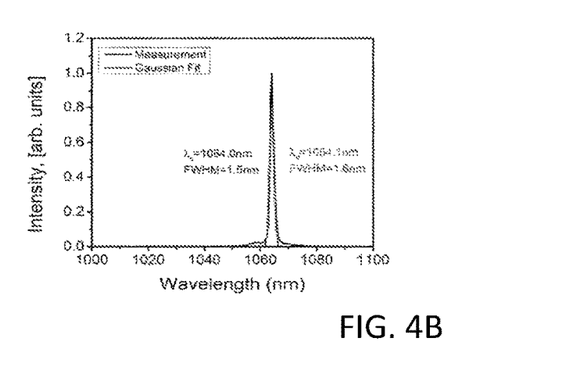

FIGS. 4A and 4B depict exemplary spectra of the pulsed coherent light, which is spectrally isolated by an adjustable monochromator 14 out of the pulsed coherent white light generated by the pulsed coherent white light source 12. FIG. 4A contains an example where either one spectral line is transmitted at a central wavelength of 800 nm or eight spectral lines between 800 nm and 825 nm are transmitted as a broad spectral range. FIG. 4B shows the spectrum of one line transmitted through the adjustable monochromator 14 at central wavelength of 1064 nm along with an estimation of the linewidth. This spectrum is also compared to a gaussian fit.

Figure 5A:
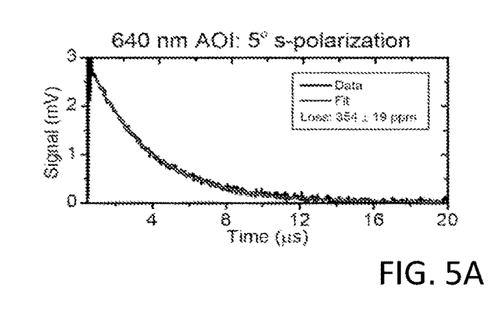
FIGS. 5A to 5D show exemplary measurement signals of cavity ring-down measurements.
Figure 5B:
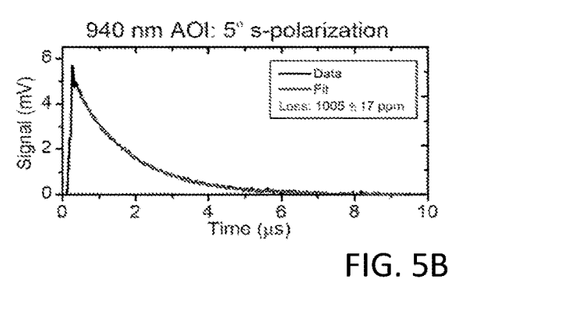
Figure 5C:
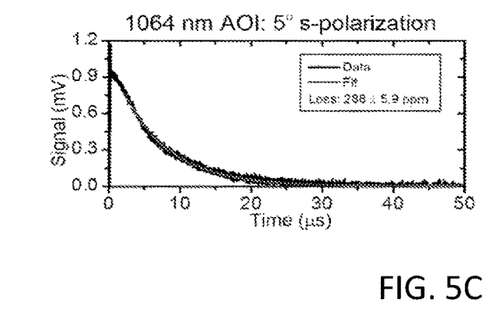
Figure 5D:
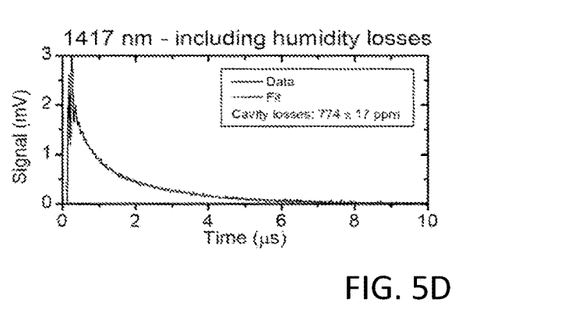

FIGS. 5A to 5D show exemplary measurement signals of cavity ring-down measurements carried out with pulsed coherent light at a central wavelength of 640 nm (FIG. 5A), 940 nm (FIG. 5B), 1.064 nm (FIG. 5C) and 1.417 nm (FIG. 5D). All measurements were recorded by the same apparatus, and thus only one single pulsed coherent white light source 12 and tunable monochromator 14 have been employed. The measurements at 640 nm, 940 nm and 1.064 nm are all measurements of optical elements with varying losses and performed at an angle of incidence of 5°. The measurement at 1.417 nm is a reference measurement of the losses of the resonator cavity 20 itself, i.e., without an additional optical element 24 inserted. Losses apart from losses originating in the cavity mirrors 20a, 20b are in this case caused by light absorption or scattering by water molecules present within the air filling the resonator cavity 20. These measurements shall serve as a proof that cavity ringdown measurements can be performed based on a broad spectral range using a pulsed coherent white light source 12 and a tunable monochromator 14.

LIST OF REFERENCE SYMBOLS 1 conventional apparatus for cavity ring-down measurements
2 laser diode
3 resonator cavity
3a, 3b cavity mirrors
4 optical detector
5 diagram of signal of loss decay
10 apparatus for measuring a reflectivity and/or transmittivity of an optical surface
12 pulsed coherent white light source
14 monochromator
16 polarization adjustment element
18 spectral bandpass filter
20 optical resonator cavity
20a, 20b cavity mirrors
22 detector
24 optical element
24a optical surface
26 housing
28 housing
30a, 30b monochromator exit ports
32 flip mirror
34 positioning device
36 rotatable mount
100 length of resonator cavity
102 angle of incidence

The invention claimed is:

1. An apparatus for measuring a reflectivity and/or transmittivity of an optical surface, the apparatus comprising:
a pulsed coherent white light source for generating pulsed coherent white light, wherein the apparatus is adapted to irradiate the optical surface with at least a part of the generated pulsed coherent white light,
a resonator cavity having a first cavity mirror and a second cavity mirror allowing to integrate the optical surface, whose reflectivity and/or transmittivity is to be measured, into the resonator cavity for measuring the reflectivity and/or transmittivity of the optical surface by using cavity ring-down reflectometry; and
a positioning device for changing and/or controlling a position and/or orientation of the first and/or second cavity mirror to allow measuring the reflectivity of the optical surface at different angles of incidence.

2. The apparatus according to claim 1, wherein the pulsed coherent white light source is designed as a pulsed supercontinuum laser light source or comprises a pulsed supercontinuum laser light source.

3. The apparatus according to claim 1, wherein the pulsed coherent white light source comprises a photonic crystal fiber.

4. The apparatus according to claim 1, wherein the pulsed coherent white light source is designed to generate pulsed coherent white light covering a spectral wavelength range of at least 675 nm to 975 nm.

5. The apparatus according to claim 1, further comprising a monochromator and/or a spectral bandpass filter for spectrally filtering the generated pulsed coherent white light to spectrally isolate pulsed coherent light having a predetermined central wavelength and/or a predetermined wavelength range and wherein the part of the generated pulsed coherent white light for irradiating the optical surface is formed by the spectrally isolated pulsed coherent light.

6. The apparatus according to claim 5, wherein the monochromator is adjustable to select the central wavelength and/or wavelength range of the spectrally isolated pulsed coherent light according to the predetermined central wavelength and/or wavelength range.

7. The apparatus according to claim 1, further including a polarization adjustment element for adjusting the polarization of the pulsed coherent light.

8. The apparatus according to claim 7, wherein the polarization adjustment element comprises a λ/2-waveplate.

9. The apparatus according to claim 1, wherein the positioning device comprises a rotatable mount for supporting an optical element, the reflective surface of which is to be measured, in a rotatable manner.

10. A method for measuring a reflectivity and/or transmittivity of an optical surface, the method comprising:

integrating an optical element having the optical surface whose reflectivity is to be measured, in a resonator cavity having a first cavity mirror and a second cavity mirror;

selecting an angle of incidence for measuring the reflectivity and/or transmittivity of the optical surface, wherein the changing and/or controlling the angle of incidence includes:

rotating the optical element such that the pulsed coherent light impinges at the optical surface at the selected angle of incidence;

changing and/or controlling a position and/or orientation of the first and/or second cavity mirror to allow measuring the reflectivity of the optical surface at the selected angle of incidence; and irradiating the optical surface with at least a part of pulsed coherent white light generated by a pulsed coherent white light source, wherein the reflectivity and/or transmittivity of the optical surface is measured by using cavity ring-down reflectometry.

11. The method according to claim 10, further comprising spectrally filtering the pulsed coherent white light generated by the pulsed coherent white light source to spectrally isolate a part of the pulsed coherent white light as a pulsed coherent light having a predetermined central wavelength and/or a predetermined wavelength range for irradiating the optical surface.

12. The method according to claim 11, further comprising adjusting a monochromator such as to select and/or adjust the central wavelength and/or wavelength range of the spectrally isolated pulsed coherent light according to the predetermined central wavelength and/or wavelength range.

* * * * *